Patented Mar. 27, 1945

UNITED STATES PATENT OFFICE 2,372,285

SILICATE COATED ARTICLE AND METHOD OF MAKING SAME

Henri M. Marc, Cincinnati, and Harold W. Greider, Wyoming, Ohio, assignors to The Philip Carey Manufacturing Company, a corporation of Ohio No Drawing. Application September 25, 1941, Serial No. 412,220

15 Claims. (Cl. 117—70)

This invention relates to coatings and the production thereof. It relates especially to hardened inorganic silicious coatings and the surface-coating of products with such coatings.

It is a purpose of this invention to improve upon the appearance and durability of surface-coatings of the character aforesaid.

It is a feature of the present invention that the inorganic coating that is applied to the surface of an article is composite in character and comprises two dissimilar layers, one of which is a base layer and the other of which is a superficial layer. The base layer contains soluble silicate, namely, sodium silicate or potassium silicate or a mixture thereof that has been insolubilized by heat-curing and also contains a heat resistant filler material to give body and opacity to the base layer. The base layer preferably contains clay which when the layer is heat-cured contributes to its insolubility and weather resistance as will be pointed out more in detail hereinbelow.

The superficial layer of the composite coating consists essentially of soluble silicate of which at least about 50% by weight is potassium silicate. Preferably the superficial layer consists substantially entirely of potassium silicate. Such a superficial layer consisting entirely of potassium silicate or at least in major proportion of potassium silicate can be heat cured to a durable and weather resistant glaze-like finish. If attempt is made to formulate the superficial layer using soluble silicate composed entirely or in major proportion of soduim silicate we have found that a satisfactory superficial layer cannot be produced.

Composite coatings of the character aforesaid can be applied to advantage to a variety of articles. The composite coatings are of especial utility and advantage in connection with indurated hydraulic cement products. Such cement products may be composed of cement per se or may contain fine granular aggregate or filler or reinforcing fibers. Thus this invention is particularly suited for veneering or coating asbestos-cement products such as shingles, siding, corrugated sheathing, and other construction materials that find wide use in the fabrication of structures. Composite coatings embodying this invention may also be employed in connection with other articles such as articles made of glass, stone products, bricks, tiles, preformed asbestos paper products, etc.

Certain features of this invention also relate to improvements in indurated cement products surface-coated with composite coating material according to this invention and to the manufacture thereof.

The base layer of the composite coating preferably is composed of a major proportion of soluble silicate. The amount of finely-divided heat resistant filler material that is used with the soluble silicate is subject to wide variations and the amount that is used relative to the soluble silicate will depend upon such factors as the thickness of the coating, the character of the filler material and the type of soluble silicate that is used. If it is merely desired to color the base layer then pigment used to the extent of about 10 to 15% (by weight of the dry solids, including soluble silicate) will give good color. In such case, however, one should employ potassium silicate rather than sodium silicate inasmuch as potassium silicate becomes much more water insoluble upon heat curing than does sodium silicate in a coating of such character, namely, consisting of soluble silicate plus a small amount of pigment as filler.

In the practice of this invention considerably better results are obtained by including in the base layer a substantial amount of clay. Clays are insoluble hydrated aluminum silicates or alumino-silicic acids, e. g., kaolinite which has the formula $Al_2O_3.2SiO_2.xH_2O$. Certain clays such as bentonite contain the mineral montmorillonite which has more silica in proportion to the alumina and has the formula $Al_2O_3.4SiO_2.H_2O$. A clay such as bentonite which tends to absorb water and to swell, is less desirable than other clays although such a clay can be used if it is mixed into the composition rapidly and the composition is applied quickly before the clay tends to swell and by absorption of water prematurely precipitate the silica in the soluble silicate.

The addition of clay to the coating composition is very desirable inasmuch as the clay has the effect of rendering the heat cured coating considerably more insoluble and resistant to water and weather than if the clay is omitted. Of the clays, the kaolinitic type clays, namely, aluminum disilicates of the general formula $$Al_2O_3.2SiO_2.xH_2O$$

are distinctly preferable. The kaolinitic type clays are obtainable of high purity and are of a physical structure that appears to be especially beneficial and effective in the coating.

The employment of clay is of particular importance in the base layer when the base layer is composed wholly or largely of sodium silicate. Sodium silicate while incapable by itself of hardening by heat curing so as to be highly weather resistant, can be greatly improved in weather resistance by the addition thereto of a substantial amount of clay. Thus a composition containing about 50% by weight of the dry solids as sodium silicate and about 20% to about 50% of kaolinitic type clay can be rendered highly insoluble by heat curing the composition at a temperature of about 900° F. to about 1000° F.

When potassium silicate is used as the soluble silicate, clay is also beneficial although potassium silicate is much better adapted to heat-curing to an insoluble condition than is sodium silicate. Moreover, even when clay is present in the composition it is regarded as preferable to employ potassium silicate as the major proportion of the soluble silicate in the composition and, especially in the coating of indurated cement products, it is desirable that at least about 75% of the soluble silicate be potassium silicate.

In addition to pigments and clay other finely-divided heat resistant inorganic filler materials may be present such as calcium carbonate (either precipitated calcium carbonate or naturally occurring calcium carbonate finely pulverized). Another suitable filler is fibrous talc such as that commonly sold under the trade-name Asbestine. Other fillers may also be used such as pulverized silica, pyrophyllite, etc.

The amount of clay that is used in the base layer is preferably about 20% to about 50% of the total dry solids. However, lesser amounts, even 5% have noticeable effect in decreasing water solubility. However, at least about 10% of clay is required to produce a pronounced effect. Where the coating consists entirely of potassium silicate as the binder, amounts of clay over about 25% by dry weight of the coating do not exercise much added effect in improving the water insolubility of the cured coating but, especially when it is desired to give considerable body and opacity to the coating, amounts of clay considerably over 25% by weight may be employed. When the soluble silicate that is used in sodium silicate, the water insolubility of the cured coating composition is increased until about 50% clay by weight is present in the coating and further amounts of clay do not materially aid in increasing the water insolubility. In general it is desirable to have at least about 20% by weight of clay in the composition of the base layer, this clay being preferably kaolinitic type clay.

In the base layer it is generally desirable that the amount of material other than heat cured soluble silicate be less than 70% by dry weight of the solids in the base layer, or conversely, that the soluble silicate should be at least about 30% by dry weight of the solids in the base layer. Preferably the soluble silicate constitutes at least about 50% of the base layer.

This invention may be practiced in several different ways. In order to afford a better understanding of this invention and of the ways in which it may be practiced specific examples will be referred to for purposes of illustration.

One highly desirable composite coating may be formulated and prepared in the manner described below and is suitable for the surface-coating of a cement product, e. g., asbestos-cement shingle or siding materials. Thus, for example, the base layer may be composed as follows (the parts being by dry weight)

| | Parts |
|---|---|
| Potassium silicate | 30 |
| Clay | 10 |
| Pigment | 10 |

The superficial layer of the composite coating may consist essentially of potassium silicate.

The potassium silicate used in both of the layers is desirably a potassium silicate wherein the molecular ratio of $K_2O$ to $SiO_2$ is about 1 to 3.7. The potassium silicate solution that is used may have a specific gravity of approximately 29° Bé. Desirably the coating composition for the base layer of the composite coating is made up prior to application so that the aqueous composition will contain about 40% to about 50% solids (by dry weight, including the potassium silicate). The aqueous composition may be applied to the cement product by any desired method of application, e. g., by spraying, brushing, or the like. The coating is preferably applied to the cement product after it has attained its initial set or may be applied after it has attained its final set or even after it has been substantially completely cured. The aqueous coating composition may advantageously be applied so that after drying and curing the veneer film will be about .003 inch in thickness. Immediately after application of the aqueous composition to the surface of the cement product, the cement product is placed in a drying chamber maintained at a temperature of about 212° F. The base coating or layer may be sufficiently dried in about 15 minutes. The coating is thereafter cured by heating the coating to about 500° F. for about 20 minutes. Preferably, however, the base coating or layer (and the superficial coating as well) is cured by exposing it to radiant heat. During the curing the soluble silicate in the base coating or layer is insolubilized to produce a highly weather and moisture resistant veneer.

After the base layer or coating has been heat cured at about 500° F. and is still at approximately this temperature or slightly below, the superficial layer consisting of potassium silicate may be applied as by spraying. This solution may be of the character aforesaid except that a 29° Bé. solution containing about 33% of solids is preferably diluted so that the soluble silicate solution will contain about 3% to about 7% of solids. The superficial coating may be applied so that the dried and cured coating will be about .0005 inch in thickness or even less down to about .0001 inch in thickness. Since the superficial layer is very thin as applied it dries very rapidly when it strikes the coated cement body, and since the cement body still is at a temperature at which curing of the potassium silicate in the superficial layer will take place, the superficial layer will become heated to heat curing temperature and will become cured without further application of heat to the cement product. In such case the curing will be rapid and at a temperature somewhat below 500° F. If desired the coating can be subjected to further heating as by exposure to hot atmosphere or to radiant heat so as to heat the superficial layer, e. g., to 500° F. or somewhat higher for the purpose of curing the superficial layer for a longer period of time. Alternatively, after heat curing the base layer, the cement product may be permitted to cool before applying the superficial layer. In such case the superficial layer can be applied as above described and then subjected to drying, e. g., at a temperature of about 200° F. to about 250° F. for 10 to 15 minutes and then heat cured for about 10 to 15 minutes at a temperature of about 350° F. to about 550° F. However, by applying the superficial layer to the heat cured base layer while the cement product is still heated the drying and curing of the superficial layer are greatly facilitated. In either event, however, the superficial layer is regarded as being subjected to drying and heat curing operations.

The product produced as above described has many advantages. In the first place the base layer of the composite coating is highly resistant to moisture and to weather. In fact it may be placed in boiling water for as long as 24 hours without injury because of excessive disintegration or excessive diminution of adhesion. The base layer gives a good body to the coating veneer insuring long useful life in service. The superficial layer adds to the weather resistance and durability of the base layer. Thus the superficial layer acts as a sealing layer which fills and covers over any irregularities, pores, or cracks that may occur in the base layer. From the point of view of appearance the superficial layer gives greater gloss. The base layer which contains a considerable amount of filler including clay, pigment, or the like, does not have much gloss. The superficial layer overcomes the dull appearance of the base layer and imparts better gloss to the coating and being transparent brings out the color in the underlying coating thereby giving the product better appearance and saleability. In this connection it may be mentioned that sodium silicate heat cured in thin films is not transparent but is milky and much less desirable for use overlying a colored base layer. For this reason, even when some sodium silicate is present in the superficial layer, it is preferable that at least 75% of the soluble silicate in the superficial layer be potassium silicate. The superficial layer imparts to the product improved resistance to staining due to the fact that there is decreased tendency for dirt and other staining materials to adhere to the surface veneer. Moreover, whatever staining material does adhere to the veneer is more easily washed off, and on roofing or siding the mere action of occasional rain will keep the surface of the veneer clean.

While the base layer of the composite coating is very durable and resistant to weather and water, the superficial layer further improves the product in this respect. Thus when a veneer coating is placed in boiling water poor resistance is indicated by chalking and by tendency of the veneer coating to scale off and become poorly adherent. By chalking is meant the tendency of the coating when rubbed with the finger to leave a chalk-like deposit on the finger. The superficial coating, while it may not per se be as resistant to water as the base layer, does have the effect of protecting the base layer with a slick, glossy and essentially filler-free layer that is continuous and substantially impermeable so that it has the effect of improving the resistance of the veneer as a whole to chalking. The superficial layer also tends to seal the base layer against access of moisture and thereby improves its adhesion to the surface covered thereby. If the composite coating is resistant to boiling water without chalking or becoming poorly adherent, it is regarded as resistant to boiling water for the period of the test. It is preferable that the composite coating be resistant to boiling water for at least about 24 hours and composite coatings having this extremely high resistance to boiling water can readily be produced according to this invention. However, a composite coating that will resist boiling water for at least about 2 hours is highly satisfactory.

In connection with the foregoing example attention is called to the fact that both the base layer and the superficial layer of the composite coating are cured at relatively low temperatures that are well under the critical temperature at which an indurated cement product is deleteriously affected by heat. Indurated hydraulic cement such as Portland cement is deleteriously affected by heat due to driving off of water of constitution which water of constitution is essential to the structural integrity and strength of an indurated cement product. This deleterious action is pronounced at temperatures around 750° F. and produces, even for short applications of such temperatures such as 2 or 3 minutes, adverse effects which are permanent and cannot be remedied by subsequent reabsorption of moisture. These adverse affects result in increased brittleness, loss of strength and lowering of modulus of rupture. At temperatures of about 800° F. or above, the breakdown of indurated Portland cement becomes very pronounced. It may also be mentioned that the application of temperatures of 750° F. or over to indurated cement products frequently results in warping and dimensional difficulties. Thus according to the present invention one can readily produce a composite veneer coating for an indurated cement product without employing during curing a temperature in excess of about 750° F. Preferably the curing step is accomplished at a temperature not greater than about 700° F. when the composite coating is applied to a cement product.

Referring to the superficial layer mentioned in the foregoing example, attention is called to the fact that it consists essentially of potassium silicate and this is the preferred method of practicing this invention. Potassium silicate alone, unmixed with other materials, unlike sodium silicate, has the capacity for becoming heat cured to a highly weather resistant material when subjected to a temperature of about 500° F. Sodium silicate when used per se does not have the capacity of becoming cured to a satisfactory weather resistant coating regardless of the temperature at which attempt is made to cure the sodium silicate. The superficial layer therefore consists, according to preferred practice, essentially of potassium silicate.

While it is preferred that the superficial layer of the composite coating consist essentially of potassium silicate a certain amount of sodium silicate may be tolerated therein but in any case a major proportion of the soluble silicate in the superficial layer should be potassium silicate. It is better, however, to have 75% or more of the soluble silicate in the superficial layer consist of potassium silicate.

In curing the superficial layer the optimum temperature is in the neighborhood of 500° F, inasmuch as maximum water resistance can be achieved in this way. At temperatures lower than 500° F. or greater than 500° F. the insolubility is somewhat less than when the curing takes place at 500° F. or thereabouts. Temperatures between about 400° F. and about 550° F. represent good practice although temperatures of about 350° F. to about 600° F. may also be employed with satisfactory results. When the soluble silicate in the superficial layer contains substantial quantities of sodium silicate the curing temperature may be somewhat higher, e. g., up to about 700° F. to about 750° F.

In some embodiments of this invention the curing of the superficial layer is not conducted so as to attain maximum water insolubility. Thus the curing may be caused to take place at a temperature of about 250° F. to about 350° F. (although it is preferable in any case to cure the superficial layer at temperatures above about 300° F.) thereby leaving the superficial layer slightly soluble in water but nevertheless having fairly high weather resistance. In this way a somewhat higher initial gloss can be obtained. Moreover, when the product is exposed to the weather, there is a very gradual weathering away of the superficial layer (and of this layer only) of the composite coating, so that over a period of several years it has the effect of permitting stains to be washed off leaving a clean, bright, new surface. The base layer is of such high weather resistance as to be substantially permanent. Thus there is afforded according to one embodiment of this invention, a base layer and a somewhat less insoluble glossy superficial layer which serves to preserve the initial appearance of the product for a period of several years. Even when the superficial layer is substantially fully cured it normally is somewhat less insoluble than the base layer and has the effect described. This is especially true when the base layer contains clay.

With regard to the base layer of the composite coating, its formulation and production are subject to quite wide variations. Thus the soluble silicate need not be entirely potassium silicate. In some modifications of this invention the soluble silicate may consist entirely of sodium silicate. Sodium silicate does not, however, have the property per se of becoming heat cured to as high degree of water insolubility and weather resistance as is the case with potassium silicate. This can be overcome, however, by the employment of a substantial amount of clay, preferably of kaolinitic type, in admixture with the sodium silicate. Thus about 20% of clay and preferably 30% or more of clay (by dry weight of solids) is employed in the base layer, the following being a typical example of a base layer wherein the soluble silicate is sodium silicate.

| | Parts |
|---|---|
| Sodium silicate | 35 |
| Kaolin clay | 20 |
| Pigment | 10 |

When sodium silicate is used the curing temperature is preferably about 900° F. to about 1000° F. With sodium silicate there is no substantial insolubilization of the soluble silicate at temperatures below about 900° F. For coating products which are not adversely affected by temperatures as high as 900° F., the curing of the base layer at approximately this temperature is not objectionable. A base layer having high resistance to water can be produced by curing at about 900° F. an aqueous composition containing sodium silicate, clay and pigment. However, for an indurated cement product such temperatures are excessive for curing due to the deleterious effects above mentioned. The curing temperature can of course be reduced by substituting potassium silicate for all of the sodium silicate. In such case approximately 500° F. is the optimum curing temperature for the base layer and about 425° F. to about 550° F. represents good practice while about 350° F. to about 600° F. affords satisfactory results. Especially when clay is employed with the potassium silicate the curing temperature for the base layer may be somewhat higher, namely, the curing temperature may be as high as about 700° F. to 750° F. Also mixtures of sodium silicate and potassium silicate may be used as the soluble silicate in the base layer. In order to secure the benefit of the potassium silicate it is advantageous that it be present in the base layer in major proportions, however, and preferably 75% by weight of the soluble silicate in the base layer is potassium silicate. When sodium and potassium silicates are in admixture the curing temperatures may advantageously be somewhat higher than is the case when the soluble silicate consists entirely of potassium silicate, i. e., may be as high as about 700° F. to 750° F. although optimum curing temperature is about 500° F. to about 600° F. for obtaining maximum weather resistance. As an example of a base layer containing a mixture of potassium silicate and sodium silicate, the following may be cited as typical (the amounts being by dry weight)

| | Parts |
|---|---|
| Potassium silicate | 21 |
| Sodium silicate | 7 |
| Kaolinitic type clay | 15 |
| Pigment | 15 |

When the soluble silicate in the base layer consists substantially entirely of sodium silicate the curing temperature may be reduced considerably below 900° F. by the employment of the special type of kaolinitic clay described in the application of Harold W. Greider and William T. Young, Serial No. 424,788 filed December 29, 1941, for Coated cement product and method of manufacturing same, now Patent No. 2,350,030, granted May 30, 1944. Thus by the employment of this special type of clay it is possible, using sodium silicate as the sole soluble silicate, to reduce the curing temperature for the base layer to about 700° F. thereby permitting satisfactory curing at a temperature that is not deleterious to indurated cement products.

The presence of clay in the base layer is regarded as distinctly preferable since it improves the resistance of the base layer to water and at the same time gives it good body. It is not essential, however, to employ clay. Thus the base layer may be composed merely of soluble silicate together with pigment. In such case the base layer may consist, for example, of about 5 parts of potassium silicate and 1 part of pigment by dry weight. However, when the clay is omitted the soluble silicate in the base layer should consist in major proportion of potassium silicate. Any suitable heat resistant pigment may be used such as titanium oxide (white), iron oxide (red, brown or black), chromic oxide (green), ultramarine blue, etc.

If desired the pigment may be omitted from the base layer using clay, for example, as the filler. Thus the base layer may consist merely of 30 parts of potassium silicate together with 12 parts of clay.

The time required for curing either the base layer or the superficial layer of the composite coating is relatively short. Thus about 15 minutes gives good results but insolubility is increased somewhat by extending the curing time to about one hour. If the curing time is extended beyond about one hour there is little effect beyond that which is obtained by curing for one hour and in fact there may even be some adverse effects that result from over-curing.

In drying the superficial coating preliminary to curing the drying is preferably expedited by applying heat. When about 75% or more of the soluble silicate in the superficial layer or in the base layer is potassium silicate, little care need be exercised in the drying temperature inasmuch as there are no substantial adverse effects that result from drying at relatively high temperatures even including curing temperatures. In such case it is desirable to carry out the drying step at a temperature of about 200° F. to about 250° F. and preferably above 212° F. When the soluble silicate contains about 25% to about 50% of sodium silicate the drying step is preferably carried out at a temperature of about 175° F. to about 210° F. In the case of a base layer consisting substantially entirely, or in major proportion, of sodium silicate, drying at elevated temperatures tends to result in intumescense and blistering, and for this reason drying should take place at atmospheric temperatures, or only slightly above. This, however, takes several hours and for this reason also the use of at least a major proportion of potassium silicate is desirable so that more rapid drying at elevated temperatures may be employed. At temperatures around 200° to 250° F. the drying step can be caused to take place in 10 to 15 minutes.

Ordinarily the drying and the curing are carried out as separate operations but this is not essential inasmuch as either the base layer or the superficial layer or both may be progressively taken through the drying temperatures into the temperature of curing, as by passing the product through an oven wherein it is subjected to progressively increasing temperature. Even the placing of the freshly applied coating composition in an oven wherein the coating is initially subjected to the curing temperature is to be regarded as involving a drying and curing operation inasmuch as the coating, even under such conditions, is first dried (very rapidly) and then cured. It is not essential that all of the water be expelled during the drying step inasmuch as after the coating composition has become initially set during drying, residual water may be expelled during the curing step.

The precise action which takes place when an aqueous soluble silicate composition is dried and cured by heating is not definitely known although it is believed that during the drying step there is gel formation and precipitation of silica and that during the heat curing step the gel is rendered irreversible thus insolubilizing the coating containing the soluble silicate. In the case of curing a soluble silicate composition comprising clay it is problematical whether the clay and the soluble silicate remain in simple admixture or form additively to more or less extent some more complex silicate. In any such event, however, for the purpose of describing and claiming this invention, the original potassium and/or sodium silicate, since it is not converted to some non-alkali metal insoluble silicate, is regarded as remaining in the composition as potassium and/or sodium silicate both during the curing step and in the cured product. As aforesaid, it is desirable that the amount of potassium silicate that is insolubilized during the heat curing of the base layer be at least about 30% by dry weight of the solids in the composition.

The potassium silicate that is used both in the base layer and in the superficial layer preferably has a molecular ratio of $K_2O$ to $SiO_2$ between about 1 to 3.7 and about 1 to 4.0. When the proportion of $SiO_2$ is greater than a ratio corresponding to 1 to 4.2, then there is excessive tendency to premature precipitation and gelation which prevents satisfactory application of the silicate to the surface of a product. On the other extreme, the amount of $SiO_2$ should not be less than a ratio corresponding to 1 to 3.0 inasmuch as lesser proportions of $SiO_2$ tend to prevent the formation of cured coatings which have a high degree of insolubility. Usually it is desirable to work with potassium silicate solutions of about 27° to 30° Bé. If attempt is made to increase the concentration much above this, then there may be a tendency to premature precipitation and gelation. When a filler is used in conjunction with potassium silicate, it is usually desirable to dilute a solution of 27 to 30° Bé. somewhat so as to facilitate application. For the base layer, generally one can readily apply the composition when the per cent. of solids by dry weight (including soluble silicate) is about 40% to 50% of the aqueous composition. The composition may be applied as a base layer at greater dilutions, but this requires evaporation of more water and ordinarily is not done except when extremely thin coatings are desired. Dilutions such that the solids (including soluble silicate) are below about 10% are not desirable, however. Preferably, the composition is applied so that the base layer when dried and cured will be about .002 to about .005 inch in thickness, about .003 inch being good practice. As aforesaid, however, for the superficial layer the soluble silicate may be applied in a dilute condition so as to provide a veneer which may be .0005 inch in thickness or which may be so thin as not to be capable of accurate measurement.

When sodium silicate is used alone or is added to potassium silicate, the sodium silicate that is used preferably has a molecular ratio of $Na_2O$ to $SiO_2$ between about 1 to 3 and about 1 to 4. Or, considering the soluble silicate as a whole in a mixture, the ratio of alkaline oxide to $SiO_2$ is desirably between about 1 to 3 and about 1 to 4; and is preferably between about 1 to 3.5 and about 1 to 4.

As aforesaid, the new product of this invention has extremely high weather resistance. One way of determining the insolubility of either the base layer, or of the superficial layer, or of the combined layers, is to obtain a sample of a product that has a 2½ x 2½ inch square surface area coated with the heat cured silicate coating so that the coating for this area has a known weight, e. g., conveniently 0.2 gram (dry weight) for the base layer and 0.025 gram (dry weight) for the superficial layer. The balance of the article is coated with a phenol aldehyde resin that is substantially impervious to and unaffected by boiling in water for about 5 minutes. The prepared specimen is placed in boiling distilled water for 5 minutes. The alkali loss is then titrated with .01 N HCl. Using this test, comparative results may be obtained and as aforesaid for potassium silicate coatings maximum insolubility is obtained by curing at about 500° F. while for sodium silicate maximum insolubility is obtained by curing at about 900° F. At other curing temperatures, less favorable results are obtained, although within the curing temperatures above mentioned very desirable results can be achieved. The curing temperature of the soluble silicate coating or coatings is therefore evidenced in the cured coatings.

The above described test enables one to determine the amount of alkali dissolved from the cured coating on the test area during the period of the test. The amount of alkali initially applied to the test area is, of course, also known since the amount of soluble silicate that is used and the composition of the soluble silicate are known. The degree of insolubilization of the soluble silicate as a result of curing is represented by the following "index of solubility" of the cured coating:

$$\frac{\text{Amount of alkali dissolved from cured coating}}{\text{Total alkali in coating as applied}} \times 100$$

If all of the alkali were to be dissolved from the cured coating the index of solubility would be 100.

Referring to the base layer per se, if the base layer contains 80% potassium silicate (dry weight) and 20% of red ferric oxide, the index of solubility of the layer, after curing at about 500° F. may be about 18. If the base layer is formulated with clay, e. g., 75% potassium silicate (dry weight) and 25% kaolin clay and cured at a temperature of about 500° F., the index of solubility may be very low, namely, about 2 or 3. Somewhat more generally for products that are to be exposed to the weather, e. g., asbestos cement shingles and sidings, it is desirable that the base layer have an index of solubility below about 20 although it is preferable that the index of solubility be below about 10. For cement products designed for interior use, e. g., wall board, tiles, etc., the index of solubility may be somewhat higher, i. e., it is desirable that the index of solubility be below about 35 and preferably below about 20.

Referring to the superficial layer per se, it is desirable that the index of solubility of this layer be below about 35 and it is preferable that the index of solubility of this layer be below about 20.

With regard to the composite layer as a whole the index of solubility of the base layer is ordinarily, although not necessarily, somewhat lower than the index of solubility of the thinner superficial layer. This is the case particularly when a substantial amount of clay is present in the base layer. Thus, for example, the index of solubility of the base layer may be below 20 or preferably below 10 while the index of solubility of the superficial layer may be greater than that of the base layer. When it is desired to produce a product wherein the superficial layer gradually dissolves over a period of several years thus preserving a clean and bright surface, the difference in index of solubility between the two layers is preferably greater than about 10. Thus, for example, in such a product the index of solubility of the base layer may be about 2 to 10 while the index of solubility of the superficial layer may be about 20 to 35 or even higher.

Considering the index of solubility of the composite coating as a whole it is deirable for products that are to be exposed to the weather that the index of solubility be below about 25 while it is preferable that the index of solubility be below about 15. For products to be used in the interior the index of solubility may be somewhat higher, i. e., it is desirable that the index of solubility be below about 35 and it is preferable that the index of solubility be below about 25.

While this invention has been described in connection with certain examples and illustrative embodiments thereof it is to be understood that this has been done for illustrative purposes only and that such examples and embodiments may be varied without departing from the scope of this invention which is to be determined by the language of the following claims.

We claim:

1. A rigid article surface coated with a hardened inorganic coating which is composite in character and which comprises a base layer and a superficial layer, said base layer being the product of drying and heat curing an aqueous composition, that contains soluble silicate of which at least about 50% is potassium silicate and that contains at least about 5% of kaolinitic type clay (by dry weight of solids in the base layer), to insolubilize said soluble silicate and harden said base layer to a solubility index not greater than 20, the insolubilized soluble silicate being at least about 30% by weight of the base layer: and said superficial layer being the product of drying and heat curing at a temperature of about 300° F. to about 600° F. an aqueous composition applied to the heat cured base layer and consisting of soluble silicate of which at least about 75% is potassium silicate, to insolubilize said soluble silicate and harden said superficial layer to a solubility index not greater than 35.

2. An indurated cement product surface-coated with a composite hardened inorganic coating comprising a base layer and a superficial layer, said base layer being the product of drying and heat curing an aqueous coating composition that contains soluble silicate consisting predominantly of potassium silicate and that contains a substantial amount of kaolinitic type clay, to insolubilize said soluble silicate and harden said base layer (said insolubilized soluble silicate in said base layer being at least about 30% by weight of the base layer and being the product of heat curing at a temperature between about 350° F. and about 600° F. to a solubility index not greater than 20); and said superficial layer being thinner than said base layer and being the product of the drying and heat curing (at a temperature of about 350° F. to about 600° F.) an aqueous composition applied to the heat cured base layer and consisting of soluble silicate of which at least about 50% by weight is potassium silicate, to insolubilize said soluble silicate and harden said superficial layer to a solubility index not greater than 35.

3. An indurated cement product according to claim 2 wherein at least 75% of said superficial layer is potassium silicate and said soluble silicate therein is the product of heat curing at a temperature of about 350° F. to 550° F.

4. A method of surface-coating a product which comprises applying to a surface of the product a composite coating, said composite coating being applied by applying to said surface as a base layer an aqueous composition that contains soluble silicate of which at least about 50% is potassium silicate and that contains a substantial amount of inorganic heat resistant filler, drying the composition and heat curing said composition for at least 15 minutes at a temperature of about 350° F. to about 600° F. to insolubilize said soluble silicate to a solubility index not greater than 20, the amount of soluble silicate in the base layer that is insolubilized during the heat curing step being at least about 30% by dry weight of the solids in the layer; applying to said heat cured base layer as a superficial layer an aqueous composition consisting of soluble silicate of which at least about 75% is potassium silicate; drying said superficial layer and heat curing said superficial layer including said soluble silicate contained therein for at least 10 minutes at a temperature of about 300° F. to 600° F. to insolubilize said soluble silicate and harden said superficial layer to a solubility index not greater than 35.

5. A method of surface-coating a product which comprises applying to a surface of the product a composite coating, said composite coating being applied by applying to said surface as a base layer an aqueous composition containing soluble silicate of which at least about 75% by weight is potassium silicate and that contains at least about 10% of kaolinitic type clay (by dry weight of the solids in the layer), drying the composition and heat curing said composition, including said soluble silicate, to insolubilize said soluble silicate and harden said base layer; applying to said heat cured base layer as a superficial layer an aqueous composition consisting of potassium silicate, drying said superficial layer and heat curing said superficial layer to insolubilize said potassium silicate and harden said superficial layer, said base layer and said superficial layer each being heat cured at a temperature of about 350° F. to about 600° F., and the soluble silicate in said layers being insolubilized by said heat curing to a solubility index for the composite coating as a whole not greater than 35.

6. A method of surface-coating a cement product which comprises applying to the surface of the product a composite coating, said composite coating being applied by applying to said surface as a base layer an aqueous composition that contains soluble silicate of which at least about 50% by weight is potassium silicate and that contains at least about 10% of kaolinitic type clay (by dry weight of the solids in the layer), drying the layer and heat curing the layer at a temperature between about 350° F. and about 600° F. to insolubilize said soluble silicate and harden said layer, the amount of soluble silicate in the base layer that is insolubilized during the heat curing step being at least about 30% by weight of the solids in the layer, applying to the heat cured base layer as a superficial layer an aqueous composition consisting of potassium silicate, drying said superficial layer and heat curing said superficial layer at a temperature of about 300° F. to about 600° F. to insolubilize said soluble silicate in said superficial layer; the soluble silicate in said layers being insolubilized by said heat during to a solubility index for the composite coating as a whole not greater than 35.

7. A method according to claim 6 wherein the soluble silicate in said base layer contains at least about 75% by weight of potassium silicate and said base layer is cured at a temperature of about 350° F. to about 550° F. and wherein said superficial layer is cured at a temperature of about 300° F. to about 550° F.

8. A rigid article surface-coated with a hardened inorganic coating which is composite in character and which comprises a base layer and a superficial layer, said base layer being the product of drying and heat curing an aqueous composition that contains soluble silicate and that contains a finely-divided inorganic heat resistant filler to harden said base layer and insolubilize said soluble silicate to a solubility index for the base layer less than 35; and said superficial layer being the product of drying and heat curing (the heat curing being at a temperature of the range about 350° F. to about 600° F.) an aqueous composition applied to said heat cured base layer and consisting of soluble silicate of which at least 50% by weight is potassium silicate to insolubilize said soluble silicate and harden said superficial layer, the solubility index of said composite coating as a whole including said base layer and said superficial layer being not substantially above 35.

9. A rigid article surface-coated with a hardened inorganic coating which is composite in character and which comprises a base layer and a superficial layer, said base layer comprising at least about 10% of clay (by dry weight of the solids in the layer) and at least about 30% by weight of soluble silicate insolubilized by heat curing in the presence of said clay to a solubility index not greater than about 20; said superficial layer being the product of drying and heat curing (the heat curing being at a temperature of the range about 350° F. to about 600° F.) an aqueous composition applied to said heat cured base layer and consisting of soluble silicate of which at least 50% by weight is potassium silicate to harden said superficial layer and to insolubilize the soluble silicate thereof to a solubility index not greater than 35; and said base layer being substantially thicker and more insoluble in water than said superficial layer.

10. A rigid article surface-coated with a hardened inorganic coating according to claim 8 wherein at least 75% by weight of said superficial layer consists of potassium silicate.

11. A rigid article surface-coated with a hardened inorganic coating according to claim 8 wherein said base layer contains at least 30% by weight of soluble silicate hardened and insolubilized by heat curing and wherein the solubility index of said superficial layer is greater than the solubility index of said base layer, the difference between the solubility indices of said layers being at least about 10.

12. A rigid article surface-coated with a hardened inorganic coating according to claim 8 wherein said superficial layer consists of potassium silicate.

13. A rigid article surface-coated with a hardened inorganic coating according to claim 9 wherein said clay in said base layer is kaolinitic type clay.

14. A method of surface-coating a product which comprises applying to a surface of the product a composite coating, said composite coating being applied by applying to said surface of the product as a base layer an aqueous composition that contains soluble silicate and that contains a substantial amount of inorganic heat resistant filler, drying said layer and heat curing said layer (the heat curing being at a temperature above 350° F.) to harden and insolubilize the soluble silicate to a solubility index not greater than 35, applying to the heat cured base layer an aqueous composition consisting of soluble silicate of which at least about 50% by weight is potassium silicate and drying said superficial layer and heat curing said superficial layer to harden said superficial layer and to insolubilize the soluble silicate thereof, the heat curing of said superficial layer being at a temperature of the range about 350° F. to about 600° F.

15. A method of surface-coating a product according to claim 14 wherein said superficial layer consists to the extent of at least 75% by weight of potassium silicate and wherein said superficial layer is heat cured at said temperature to a solubility index not substantially greater than 35.

HENRI M. MARC.
HAROLD W. GREIDER.